United States Patent
Kobayashi et al.

(10) Patent No.: US 11,113,558 B2
(45) Date of Patent: Sep. 7, 2021

(54) INFORMATION PROCESSING APPARATUS AND NON-TRANSITORY COMPUTER READABLE MEDIUM STORING INFORMATION PROCESSING PROGRAM FOR CHARACTER STRING EXTRACTION

(71) Applicant: FUJIFILM Business Innovation Corp., Tokyo (JP)

(72) Inventors: Kunihiko Kobayashi, Kanagawa (JP); Junichi Shimizu, Kanagawa (JP); Daigo Horie, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 40 days.

(21) Appl. No.: 16/528,640

(22) Filed: Aug. 1, 2019

(65) Prior Publication Data
US 2020/0234073 A1    Jul. 23, 2020

(30) Foreign Application Priority Data
Jan. 22, 2019    (JP) .............................. JP2019-008665

(51) Int. Cl.
*G06K 9/34*    (2006.01)
*G06K 9/00*    (2006.01)

(52) U.S. Cl.
CPC ......... *G06K 9/344* (2013.01); *G06K 9/00456* (2013.01); *G06K 9/00469* (2013.01); *G06K 2209/01* (2013.01)

(58) Field of Classification Search
CPC ........... G06K 2209/01; G06K 9/00456; G06K 9/00469; G06K 9/344
See application file for complete search history.

(56) References Cited

U.S. PATENT DOCUMENTS

| | | | |
|---|---|---|---|
| 8,139,870 B2 | 3/2012 | Kato | |
| 9,785,830 B2* | 10/2017 | Hausmann | ........... G06K 9/6218 |
| 2016/0117551 A1* | 4/2016 | Hausmann | ......... G06K 9/00469 |
| | | | 382/161 |
| 2018/0232573 A1 | 8/2018 | Yamazaki | |

FOREIGN PATENT DOCUMENTS

| | | |
|---|---|---|
| JP | 2007-233913 | 9/2007 |
| JP | 2007-233917 | 9/2007 |
| JP | 2018-128996 | 8/2018 |

OTHER PUBLICATIONS

Ruch, Patrick, et al. "Using argumentation to extract key sentences from biomedical abstracts." International journal of medical informatics 76.2-3 (2007): 195-200. (Year: 2007).*

* cited by examiner

*Primary Examiner* — Tsung Yin Tsai
(74) *Attorney, Agent, or Firm* — JCIPRNET

(57) ABSTRACT

An information processing apparatus includes an extraction unit that extracts a character string corresponding to a keyword from a character string including the keyword described across plural lines, in accordance with an extraction condition of the character string corresponding to the keyword, a combining unit that combines character strings extracted by the extraction unit in accordance with a line sequence, and an output unit that the character strings combined by the combining unit as a character string corresponding to the keyword.

12 Claims, 10 Drawing Sheets

INFORMATION PROCESSING APPARATUS AND NON-TRANSITORY COMPUTER READABLE MEDIUM STORING INFORMATION PROCESSING PROGRAM FOR CHARACTER STRING EXTRACTION

CROSS-REFERENCE TO RELATED APPLICATIONS

This application is based on and claims priority under 35 USC 119 from Japanese Patent Application No. 2019-008665 filed Jan. 22, 2019.

BACKGROUND

(i) Technical Field

The present invention relates to an information processing apparatus and a non-transitory computer readable medium storing an information processing program.

(ii) Related Art

An information processing apparatus that extracts a character string associated with an item represented by a specific keyword desired by a user from a document image read by a scanner is known.

JP2007-233913A discloses an image processing apparatus that extracts a value of an information item from an input document image. The image processing apparatus includes an extraction item storage unit that stores extraction item information including an item name of an information item as an extraction target, a character recognition unit that performs character recognition of the document image, an item name extraction unit that extracts a character string corresponding to the item name of the extraction target stored in the extraction item storage unit from a character recognition result output from the character recognition unit, an item value extraction unit that extracts a character string of an item value corresponding to the item name, from the neighboring position of the character string corresponding to the item name in the document image, and an extraction information creation unit that creates extraction information by associating the character string of the item value extracted from the item value extraction unit with the item name.

JP2018-128996A discloses an information processing apparatus including an extraction section that extracts a region by performing region analysis processing on an image, acquisition section that acquires a rule for extracting a specific keyword and a value corresponding to the keyword, a determination section that determines an order for specifying the region including the keyword and the region including the value corresponding to the keyword by using the rule, in accordance with values allowed to be taken by the keyword and the value corresponding to the keyword included in the rule; a specifying section that specifies the region including the keyword or the region including the value corresponding to the keyword from the extracted region in accordance with the determined order; and a character recognition section that performs character recognition processing on the specified region. The specifying section specifies the other corresponding region based on the previously-specified region, in accordance with the determined order.

SUMMARY

For example, a predetermined notation such as "Messrs" is used in a document such as an estimate sheet with following the company name of a submission destination. Thus, in a case where optical character recognition (OCR) processing is performed on a document image read by the scanner, and a character string described in a description line of "Messrs" is extracted by using "Messrs" as the keyword, the company name of the submission destination of the document is obtained.

However, in a case where a document is read by the scanner, and OCR processing is performed, even though a series of connected character strings are described across lines, since concatenation information of a character string described across lines is not provided, a situation in which it is not known whether a character string described in a line different from the description line of the keyword represents the character string corresponding to the keyword occurs. Thus, until now, only a character string included in the same line as the description line of the keyword is extracted as the character string corresponding to the keyword. That is, in a case where the character string corresponding to the keyword is included in a line different from the description line of the keyword, it is not possible to correctly extract the character string corresponding to the keyword.

Aspects of non-limiting embodiments of the present disclosure relate to provide an information processing apparatus and a non-transitory computer readable medium storing an information processing program in which it is possible to output a character string corresponding to a keyword even in a case where the character string corresponding to the keyword is also included in a line different from a description line of the keyword.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including an extraction unit that extracts a character string corresponding to a keyword from a character string including the keyword described across a plurality of lines, in accordance with an extraction condition of the character string corresponding to the keyword, a combining unit that combines character strings extracted by the extraction unit in accordance with a line sequence, and an output unit that the character strings combined by the combining unit as a character string corresponding to the keyword.

BRIEF DESCRIPTION OF THE DRAWINGS

Exemplary embodiment(s) of the present invention will be described in detail based on the following figures, wherein.

DETAILED DESCRIPTION

Hereinafter, an exemplary embodiment will be described with reference to the drawings. The same constituent components and the same processes having the same functions are denoted by the same reference signs through all the drawings, and descriptions thereof will not be repeated.

Exemplary Embodiment

Figure 1:
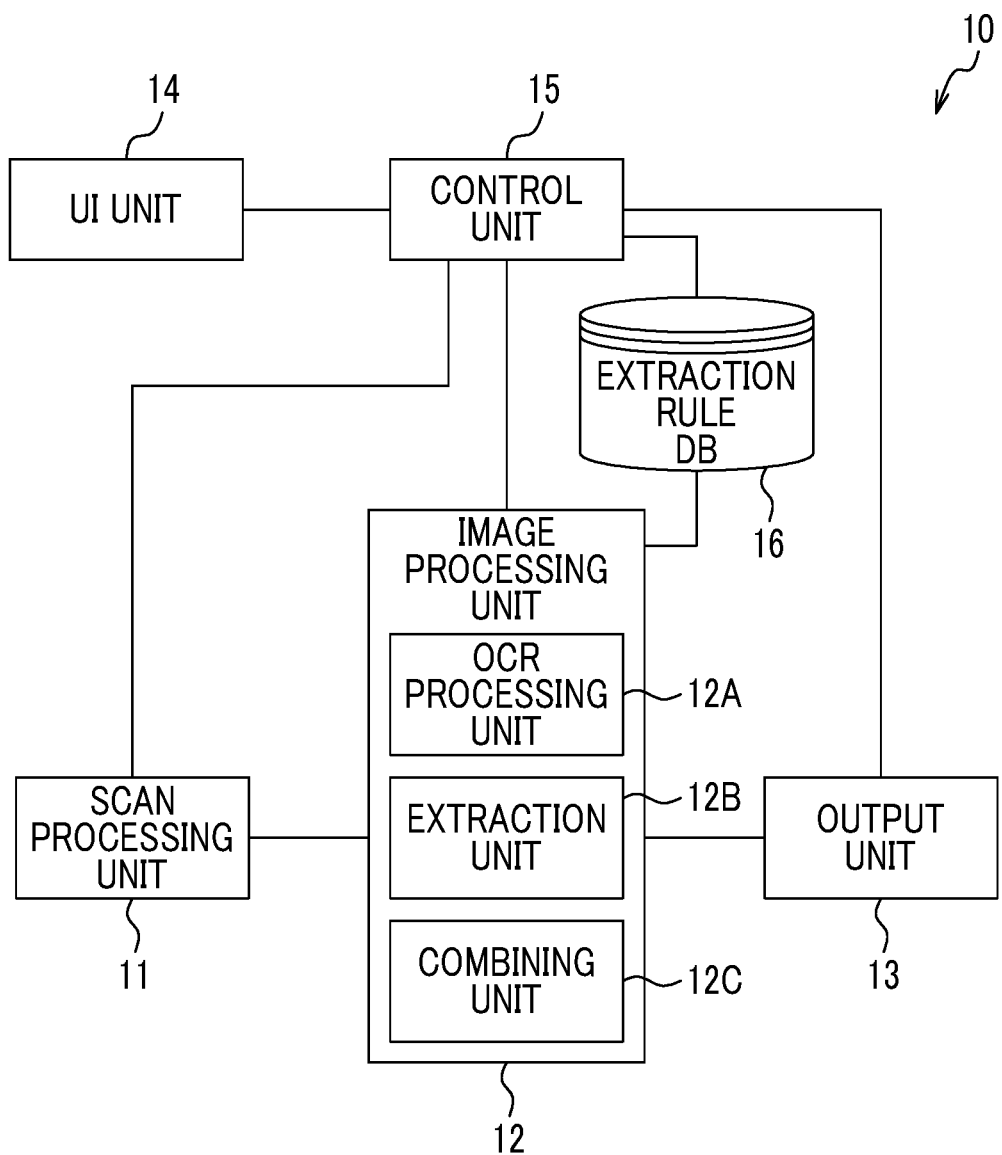
FIG. 1 is a block diagram illustrating an example of a functional configuration of an information processing apparatus.

FIG. 1 is a block diagram illustrating an example of a functional configuration of an information processing apparatus 10 that extracts a character string corresponding to a keyword, from a document subjected to, for example, OCR processing, and outputs the extracted character string.

The information processing apparatus 10 includes functional units including a scan processing unit 11, an image processing unit 12, an output unit 13, a user interface (UI) unit 14, and a control unit 15, and an extraction rule database (DB) 16.

The scan processing unit 11 generates an image (referred to as "a document image" below) corresponding to an original document, with a scanner unit 50 that optically reads the content described on the original document, and then transfers the generated image to the image processing unit 12.

The image processing unit 12 includes an OCR processing unit 12A, an extraction unit 12B, and a combining unit 12C.

The image processing unit 12 receives the document image from the scan processing unit 11. Firstly, the OCR processing unit 12A performs well-known image recognition of the document image and converts an image corresponding to a character in the document image into a character code. That is, the document image is handled as the character information, and copying and searching of a character are performed, by the OCR processing unit 12A. It is assumed that conversion data obtained by the OCR processing unit 12A converting the document image into the character information is referred to as "a document 20" below.

The extraction unit 12B extracts a character string corresponding to a keyword designated by a user, from the document 20 generated by the OCR processing unit 12A.

Figure 2A:
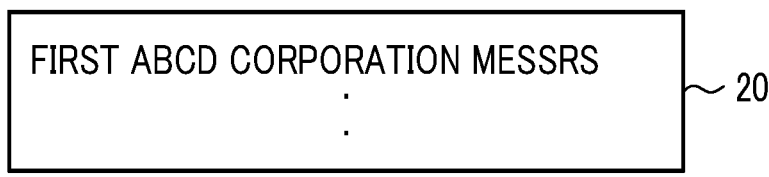
FIGS. 2A and 2B are diagrams illustrating an example of a document.
Figure 2B:
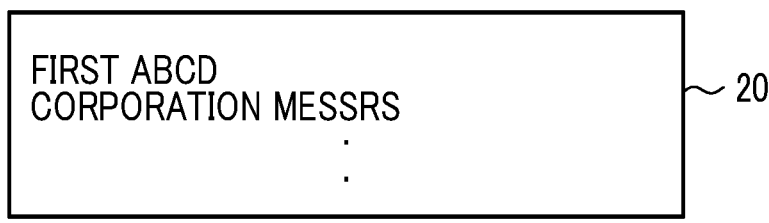

FIGS. 2A and 2B are diagrams illustrating an example of a keyword included in the document 20 and a character string corresponding to the keyword. The type of content of the document 20 handled by the information processing apparatus 10 is not limited. A character string corresponding to the keyword is extracted from a document 20 having any content. Here, a document 20 such as an estimate sheet, which has a content to be submitted to another company will be described as an example.

In a case where such a document 20 to be submitted to another company is managed, a user may want to extract, for example, the company name of a submission destination or the creation date of an estimate sheet from each document 20 for the purpose of managing the document 20 for each company as the submission destination. A predetermined title, for example, "Messrs" is attached to the name of the company as the submission destination. The date on which the estimate sheet is created is described along with the name of a predetermined item, such as "creation date".

Such a word attached to a character string to be extracted and an item name of the character string to be extracted are referred to as "keywords", and a character string representing the content of the keyword is referred to as "a value". That is, the value means a character string corresponding to a keyword.

In a case of a document 20 illustrated in FIG. 2A, "Messrs" is a keyword, and "First ABCD Corporation" is a value of the keyword. "." vertically arranged in the document 20 indicates that other contents which are not illustrated are included in the document 20.

In addition to a form, as illustrated in FIG. 2A, in which the keyword and the value are included in the same line, even in a case, as illustrated in FIG. 2B, where a value is described in a plurality of lines, the extraction unit 12B determines whether or not character strings described across the plurality of lines represent a series of values for the keyword, based on an extraction rule 30 stored in the extraction rule DB 16. In a case where it is determined that the character strings are the series of values for the keyword, the character strings are extracted as character strings constituting the value for the keyword.

In the following descriptions, each of a plurality of character strings constituting a value for a keyword will be expressed as "a value", but may be expressed as "a partial value", in particular, in a case where descriptions are made by emphasizing that this value is different from a final value, or in a case where distinguishment from the final value is required for easy understanding. The "final value" is a value which is obtained by combining partial values and is desired by a user, for example.

Figure 3:
FIG. 3 is a diagram illustrating an example of an extraction rule.

FIG. 3 is a diagram illustrating an example of the extraction rule 30. The extraction rule 30 refers to information in which an extraction condition of a value is defined, and which is applied in a case where the extraction unit 12B extracts the value of a keyword. A character string extracted in accordance with the extraction rule 30 serves as the value of the keyword.

In the extraction rule 30 in FIG. 3, a first extraction direction is an extraction condition in which an extraction condition of a value in a description line of the keyword is determined in a case of being viewed from a description position of the keyword.

For example, in a case where "left" is set as the first extraction direction, the extraction unit 12B extracts a character string located on the left side of the keyword as a value. In a case where "right" is set as the first extraction direction, the extraction unit 12B extracts a character string located on the right side of the keyword as the value. In a case where "no extraction" is set as the first extraction direction, the extraction unit 12B does not extract the value from the description line of the keyword.

In a case where a value extracted from a line different from a description line of the keyword, a second extraction direction is an extraction condition of determining a transition direction which is a direction from the description line of the keyword to an extraction target line of the value.

For example, in a case where "up" is set as the second extraction direction, the extraction unit 12B sets a direction from the description line of the keyword to the previous line as a direction of the extraction target line of a value. Then, the extraction unit 12B extracts a character string of the line set as the extraction target line of the value, as the value. "Being directed from the description line of the keyword to the previous line" means repetition of firstly transitioning to an upper line adjacent to the description line of the keyword, and then, transitioning to an upper line adjacent to a line as a transition destination.

In a case where "down" is set as the second extraction direction, the extraction unit 12B sets a direction from the description line of the keyword to the subsequent line as a direction of the extraction target line of a value. Then, the extraction unit 12B extracts a character string of the line set as the extraction target line of the value, as the value. "Being directed from the description line of the keyword to the subsequent line" means repetition of firstly transitioning to a lower line adjacent to the description line of the keyword, and then, transitioning to a lower line adjacent to a line as a transition destination.

In a case where "no extraction" is set as the second extraction direction, the extraction unit 12B does not extract a value from other lines different from the description line of the keyword.

"An extraction end condition" refers to an extraction condition of determining a range of a line to be set as the extraction target line of the value, in a direction designated as the second extraction direction. FIG. 3 illustrates an example in which the range is set by the number N (N is an integer). For example, a case where the number N is "1" is set as "Condition 1", and a case where the number N is "2" is set as "Condition 2". That is, the extraction end condition to be used by the information processing apparatus 10 is set from a plurality of predefined conditions. A specific content of the extraction end condition will be described in detail later.

The combining unit 12C combines partial values extracted by the extraction unit 12B, generates a final value corresponding to the keyword, and transfers the final value to the output unit 13. In a case where one value is extracted by the extraction unit 12B, the combining unit 12C sets the one value as the final value corresponding to the keyword.

In a case where the output unit 13 receives the value from the combining unit 12C in the image processing unit 12, the output unit 13 outputs the value associated with the keyword. "Outputting the value" means being in a state where recognition of what kind of character string is the value extracted from the document is possible. A target for recognizing the value is not limited to a person and may be a device. Thus, a case where the value associated with the keyword is displayed in a display device, a case of being printed on a sheet, a case of being notified by sound, a case of being stored in a storage device, and a case of being transmitted from a communication unit 47 (described later) through a communication line (not illustrated) are forms of representing the output of the value.

The UI unit 14 receives an instruction from the user and notifies the user of various kinds of information of, for example, an operation and a state of the information processing apparatus 10. For example, the UI unit 14 receives a setting instruction to designate a keyword and set the content of the extraction rule 30, from the user. The UI unit 14 notifies the user of the value extracted from the document in accordance with the extraction rule 30 set by the user.

The control unit 15 controls processing of each of the functional units including the scan processing unit 11, the image processing unit 12, the output unit 13, and the UI unit 14. In addition, the control unit 15 generates or changes the extraction rule 30 in accordance with setting contents of the user and manages the extraction rule DB 16.

Figure 4:
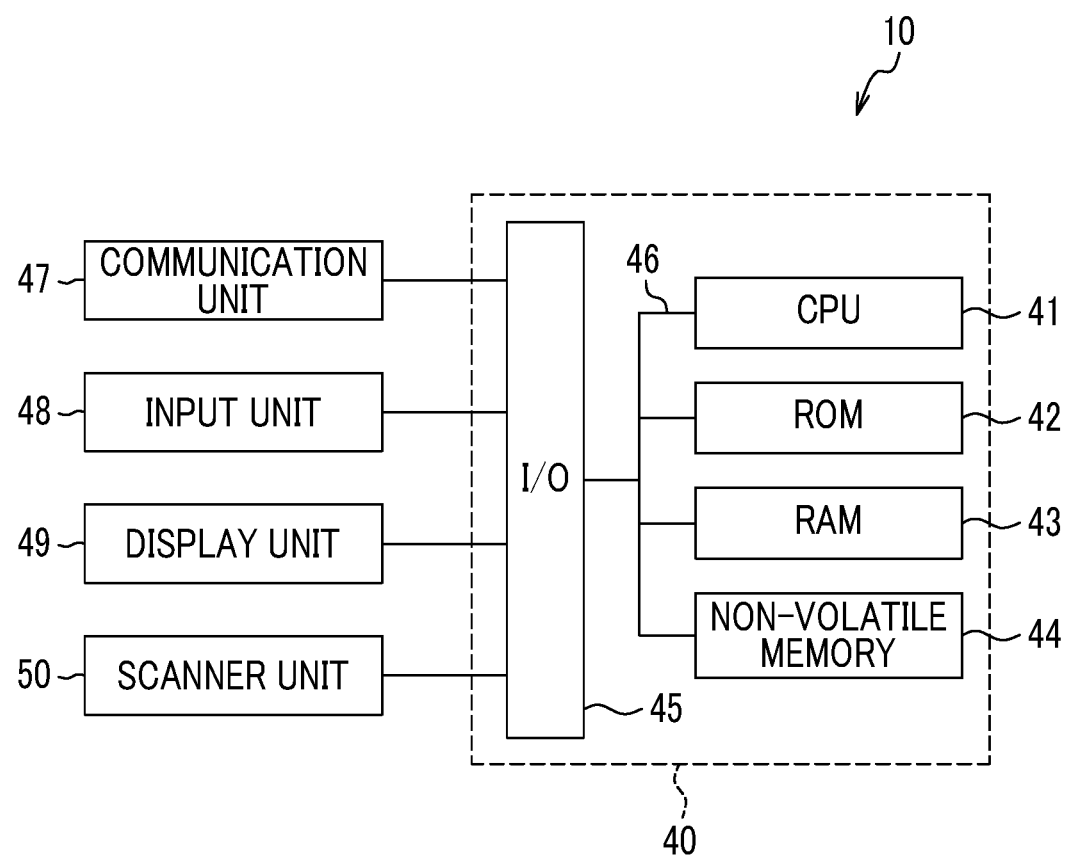
FIG. 4 is a diagram illustrating an example of a main configuration of an electric system in the information processing apparatus.

FIG. 4 is a diagram illustrating an example of the main configuration of an electric system in the information processing apparatus 10. The information processing apparatus 10 is configured with a computer 40, for example.

The computer 40 includes a central processing unit (CPU) 41 that handles the functional units according to the exemplary embodiment, a read only memory (ROM) 42 that stores an information processing program, a random access memory (RAM) 43 used as a temporary work area of the CPU 41, a non-volatile memory 44, and an input and output interface (I/O) 45. The CPU 41, the ROM 42, the RAM 43, the non-volatile memory 44, and the I/O 45 are connected to each other via a bus 46.

The non-volatile memory 44 is an example of a storage device in which stored information is maintained even though power supplied to the non-volatile memory 44 is cut off. As the non-volatile memory 44, for example, a semiconductor memory is used, but a hard disk may be used. The non-volatile memory 44 is not necessarily built in the computer 40, and may be a storage device such as a memory card, which is attachable to from the computer 40.

For example, the communication unit 47, an input unit 48, a display unit 49, and the scanner unit 50 are connected to the I/O 45.

The communication unit 47 is connected to a communication line (not illustrated) and includes a communication protocol for performing communication with a storage device and an external device (such as a computer) which are connected to a connection line (not illustrated).

The input unit 48 receives an instruction from the user and notifies the CPU 41 of the instruction. As the input unit 48, for example, buttons, a touch panel, a keyboard, and a mouse are used. The information processing apparatus 10 performs a function of which an instruction is received from the user with the input unit 48. The information processing apparatus 10 may receive the instruction from the user by sound. In this case, a microphone is connected to the I/O 45.

The display unit 49 is a device that displays information processed by the CPU 41, in a form of an image. For example, a liquid crystal display, an organic electro luminescence (EL) display, a projector for projecting an image on a screen, or the like is used.

The scanner unit 50 is a device that, for example, optically reads the content of an original document placed on platen glass (not illustrated) and converts the content of the original document into a document image, in accordance with an instruction of the CPU 41. The scanner unit 50 is used in processing of the scan processing unit 11.

In the information processing apparatus 10, the scan processing unit 11 receives the document image read by the scanner unit 50. However, it is not necessary that the scan processing unit 11 receives the document image from the scanner unit 50 connected to the I/O 45. For example, the information processing apparatus 10 may receive a document image read by a scanner device (not illustrated) connected to a communication line (not illustrated) through the communication unit 47. The information processing apparatus 10 may receive a document image stored in a cloud server.

The units connected to the I/O 45 are not limited to the units illustrated in FIG. 4. For example, an image forming unit that forms processed information on a recording medium in accordance with an instruction of the CPU 41 may be connected to the I/O 45.

In a case where the information processing apparatus 10 receives the document image through the communication unit 47 or a detachable semiconductor memory, the scanner unit 50 is not necessarily required. In this case, information equipment such as a desktop computer, a tablet computer, a smartphone, and a wearable computer, which includes an input and output device and a processing function of processing input information is used as the information processing apparatus 10. The input and output device provides an interface with a user.

Next, an operation of the information processing apparatus 10 that extracts a value corresponding to a keyword from a document will be described. At this time, the value is described across a plurality of lines.

Figure 5:
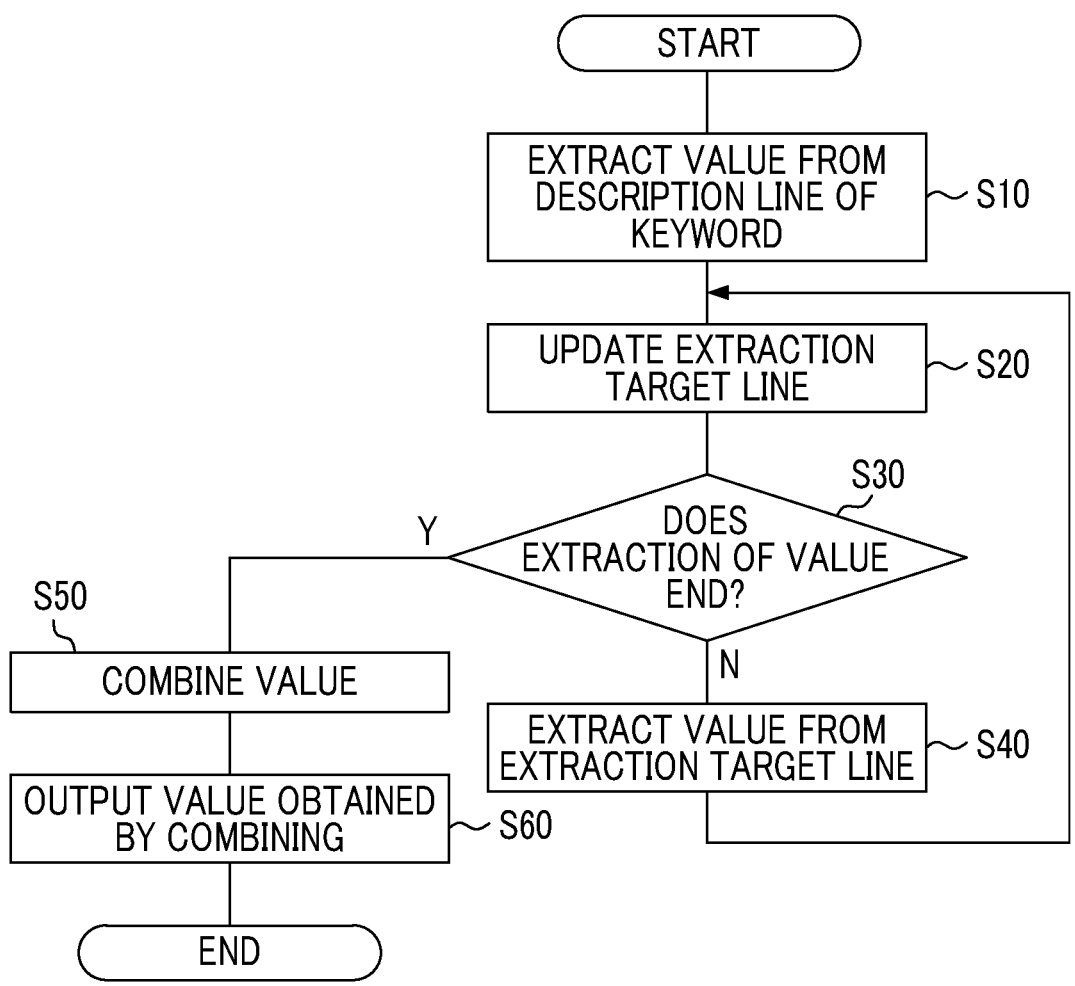
FIG. 5 is a flowchart illustrating an example of a flow of information processing.

FIG. 5 is a flowchart illustrating an example of a flow of information processing performed by the CPU 41 in a case where the image processing unit 12 receives a document image in accordance with an instruction of a user, and the OCR processing unit 12A converts the received document image into a document 20. The information processing program of defining information processing is stored, for example, in the ROM 42 of the information processing apparatus 10 in advance. The CPU 41 of the information processing apparatus 10 reads the information processing program stored in the ROM 42 to perform information processing.

It is assumed that a keyword corresponding to a value to be acquired by the user is set in the information processing apparatus 10 in advance. Specifically, an example in which the user sets "Messrs" being a title attached to the name of a company, as a keyword in order to acquire the name of the company as a submission destination of an estimate sheet, as a value, will be described. However, as a character string set for the keyword, any character string may be set. A extraction rule 30 set in advance is stored in the non-volatile memory 44.

Figure 6:
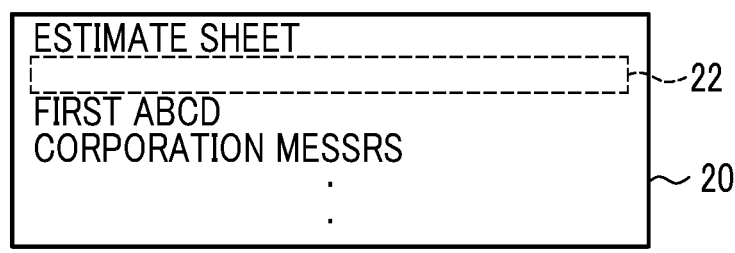
FIG. 6 is a diagram illustrating an example of a document including a blank line.

In Step S10, the CPU 41 determines a character code to specify a line in which a keyword set by a user is provided, that is, to specify a description line of the keyword from the received document 20. The CPU 41 extracts a value from the description line of the keyword by referring to a setting value of the first extraction direction, which is included in the extraction rule 30. The CPU 41 stores the extracted value in the RAM 43. For example, in a case where the extraction rule 30 is set as in FIG. 3 (N of the extraction end condition is set to 1), and the received document 20 is a document 20 as illustrated in FIG. 6, the CPU 41 extracts a character string on the left side of "Messrs", that is, "Corporation" as a value in the description line of the keyword.

The user may set designation of whether or not a space is included in the value, in the extraction rule 30. Here, descriptions will be made on the assumption that a setting of not including a space in the value has been performed.

In Step S20, the CPU 41 updates an extraction target line for extracting the value the next time, by referring to the setting value of the second extraction direction included in the extraction rule 30. In a case where the setting value of the second extraction direction included in the extraction rule 30 is "up", the CPU 41 sets the extraction target line for extracting the value the next time, to be an upper line adjacent to the line from which extraction of the value has been performed. In a case of the document 20 in FIG. 6, after the value is extracted in the description line of the keyword, a line in which a character string of "First ABCD" is provided is set as the extraction target line of the value.

In Step S30, the CPU 41 determines whether or not extraction of the value ends, by referring to the setting value of the extraction end condition included in the extraction rule 30. Specifically, in a case where the updated extraction target line of the value satisfies an extraction end condition, the CPU 41 determines that extraction of the value ends.

A document in which a blank line is provided to cause a person to easily understand the range of the value corresponding to the keywords may be provided. In such a case, a description range of the value corresponding to the keyword is indicated by whether or not the blank line is provided.

Thus, the setting value N of the extraction end condition is set to "1" representing "Condition 1", and "Condition 1" is associated with a condition of ending by detection of a blank line". Thus, in a case where the updated extraction target line of the value is a blank line, the CPU 41 determines that the description range of the value has ended, and ends the extraction of the value. In a case of the document 20 in FIG. 6, since the character string of "First ABCD" is included in the updated extraction target line of the value, the extraction of the value continues.

As described above, in a case where it is determined that the extraction of the value does not end, the process proceeds to Step S40.

In Step S40, the CPU 41 extracts a character string included in the updated extraction target line of the value, as the value, and stores the extracted character string in the RAM 43. In a case of the document 20 in FIG. 6, the character string of "First ABCD" is extracted as the value.

After Step S40 is performed, the process proceeds to Step S20. That is, until it is determined that the extraction of the value ends, in a determination process of Step S30, the CPU 41 updates the extraction target line of the value one by one in the extraction direction set by the setting value of the second extraction direction included in the extraction rule 30, and continues processing of extracting the value from the extraction target line of the value in Step S40.

In a case of the document 20 in FIG. 6, since an upper line of the line in which the character string of "First ABCD" is included is a blank line 22, the value corresponding to the keyword is extracted from each of lines from the description line of the keyword to a line before the blank line 22.

In a case where the updated extraction target line of the value satisfies the extraction end condition, and it is determined that the extraction of the value ends, in the determination process of Step S30, the process proceeds to Step S50.

In Step S50, the CPU 41 combines the extracted values in accordance with a line sequence and generates a final value. The phrase of "combining the values in accordance with the line sequence" means that the values are combined in the transition direction of the line, which is represented by the second extraction direction of the extraction rule 30.

The character strings are described in lines from an upper line to a lower line. "On-the-go" as an example of the keyword is a keyword attached to the end of the name of the company. As described above, in a case where the keyword is attached to the end (also referred to as the back) of the value, the user sets the second extraction direction to "up". Thus, in a case where the second extraction direction is set to "up", the CPU 41 sets the value extracted last to be the leading such that the later extracted value is located earlier. Thus, the CPU 41 sequentially combines the extracted values to generate the final value. In other words, the CPU 41 combines the extracted values such that the value extracted from a line farther from the description line of the keyword is located earlier.

On the contrary, in a case where the keyword is attached to the beginning (also referred to as the front) of the value, the user sets the second extraction direction to "down". Thus, in a case where the second extraction direction is set to "down", the CPU 41 sets the value extracted first to be the leading such that the earlier extracted value is located earlier. Thus, the CPU 41 sequentially combines the extracted values to generate the final value. In other words, the CPU 41 combines the extracted values such that the value extracted from a line closer to the description line of the keyword is located earlier.

In Step S60, the CPU 41 outputs the value obtained by combining in Step S50 and ends the information processing illustrated in FIG. 5.

As described above, according to the information processing apparatus 10 of the exemplary embodiment, partial values are extracted from lines in which it is determined that the value is included, based on the extraction rule 30 of defining a description area of the value in the document. Then, the final value is acquired by combining the extracted partial values in accordance with the line sequence. Although a case where the description area of the value is separated by a blank line has been described here, the description line of the value may be determined, for example, by using at least one hyphen "-", or a line including a symbol used as a break instead of a blank line. A symbol to be used as a break may be registered in advance in the non-volatile memory 44, and the information processing apparatus 10 may detect whether or not the extraction target line of the value is a break line, by referring to the symbol.

Modification Example 1 of Exemplary Embodiment

Figure 7:
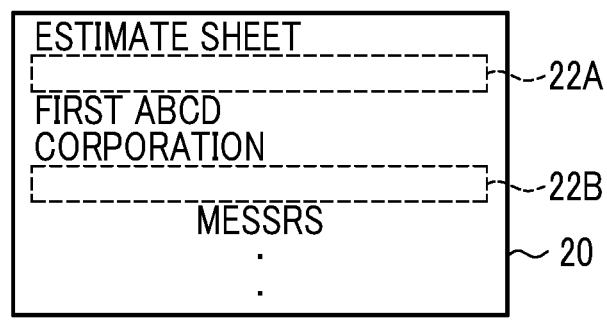
FIG. 7 is a diagram illustrating another example of the document including the blank line.

The information processing apparatus 10 does not extract a value from one type of document 20 having a format which is fixed in advance, but extracts a keyword from documents 20 having various formats. Thus, a case where a document having a format, for example, in which a blank line 22B is provided between a description line of the keyword and the value, and the value is separated by the blank line 22A and the blank line 22B is provided, as illustrated in FIG. 7, among documents 20 which is processed by the information processing apparatus 10 is considered. However, in a case where the document having a format as illustrated in FIG. 7 is processed by information processing illustrated in FIG. 5, and the blank line 22B is read, even though the value is provided in an upper line of the blank line 22B, extraction of the value ends by the determination process in Step S30.

Thus, here, information processing of the information processing apparatus 10 that extracts the value corresponding to the keyword eve in a case where the value is not included in the description line of the keyword, and a blank line is provided between the description line of the keyword and a line in which the value is provided will be described.

Figure 8:
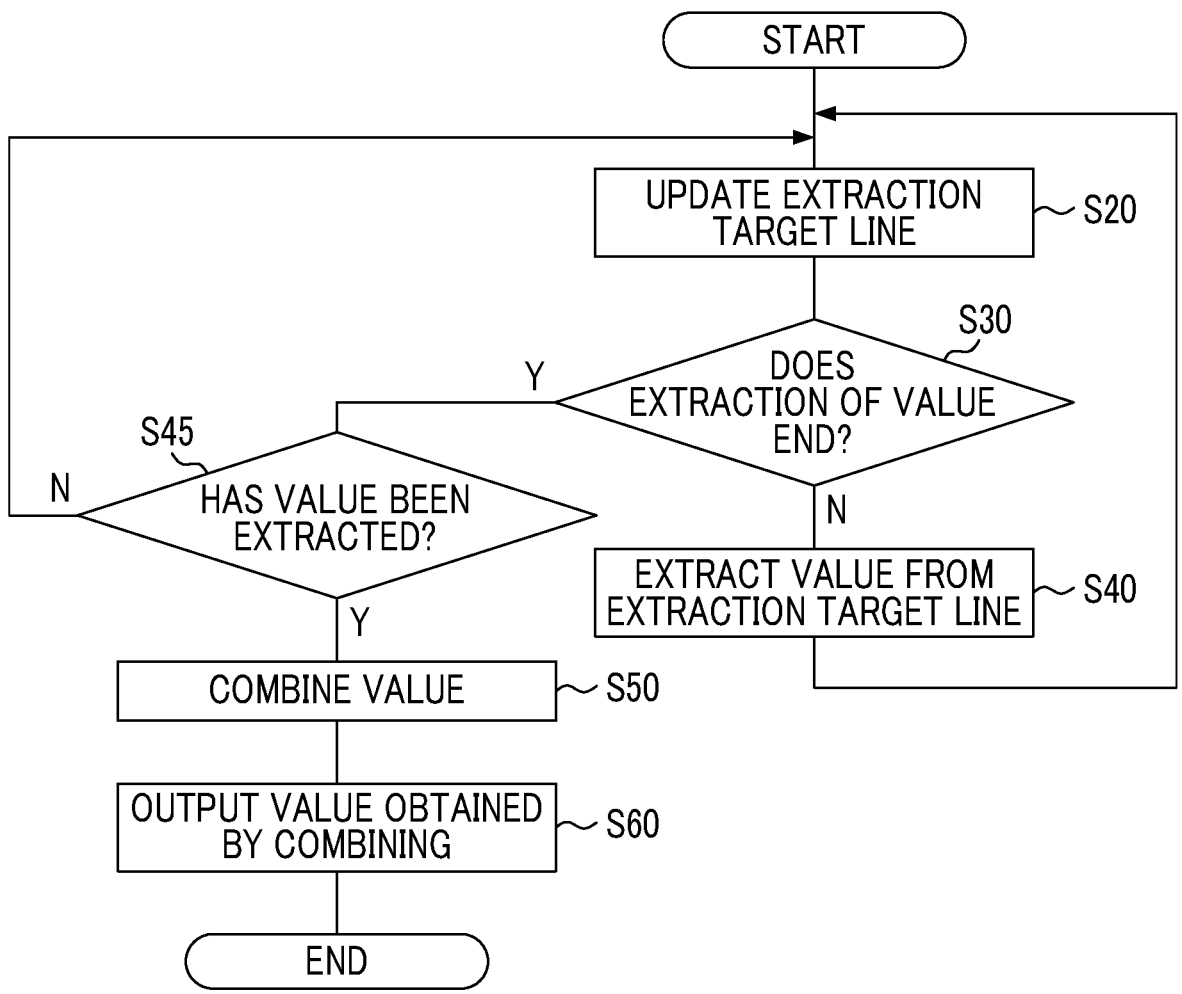
FIG. 8 is a flowchart illustrating an example of the flow of the information processing in a case where a value is not included in a description line of a keyword.

FIG. 8 is a flowchart illustrating an example of a flow of information processing performed by the CPU 41 in a case where there is an attempt to extract the value from the description line of the keyword in Step S10 in FIG. 5, but the value is not extracted (in a situation in which all except the character string of the keyword are spaces). The information processing illustrated in FIG. 8 is different from the processes of the information processing illustrated in FIG. 5 after Step S20 in that Step S45 is added.

As the extraction rule 30, the extraction rule 30 illustrated in FIG. 3 (in which "Condition 1" is set as the extraction end condition) is used.

In Step S20, in a case where the CPU 41 sets the blank line 22B in FIG. 7 to the next extraction target line of the value, the CPU 41 determines that extraction of the value ends, by the determination process of Step S30, and thus the process proceeds to Step S45.

In Step S45, the CPU 41 determines whether or not the value has been extracted from the description line of the keyword. A situation in which the value is not extracted from the description line of the keyword, and the blank line 22B appears causes a point that the blank line 22B is not a blank line indicating the end of the description range of the value, but a blank line indicating that the description range of the value starts from this line to be recognized. Thus, in a case where the value is not extracted from the description line of the keyword, the process proceeds to Step S20. Accordingly, the CPU 41 updates the extraction target line for extracting the value the next time in a direction indicated by the second extraction direction included in the extraction rule 30.

Since the processes of Steps S20 to S45 are repeated, the value is extracted from lines from a line in which the value has been extracted for the first time until the blank line appears again after the a line including the value appears, by sequentially referring the lines from the description line of the keyword until the line including the value appears, in the direction indicated by the second extraction direction. Thus, as illustrated in FIG. 7, even in a case where the value described across a plurality of lines is separated by the blank line 22A and the blank line 22B, "First ABCD Corporation" is extracted as the value corresponding to the keyword of "Messrs".

Modification Example 2 of Exemplary Embodiment

Hitherto, the information processing apparatus 10 that extracts the value which corresponds to the keywords and is described across a plurality of lines, from a document in which a blank line is used as a break of the description range of the value is described. However, among documents, there is a document in which the blank line is not used as the break of the description range of the value.

Figure 9:
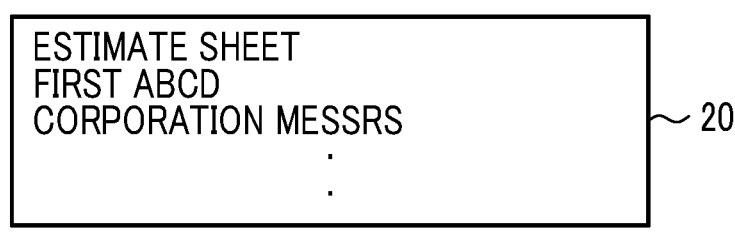
FIG. 9 is a diagram illustrating an example of a document in which the number of description lines of values is predetermined.

For example, in an example of a document 20 in FIG. 9, a blank line is not provided between the name of a company and the title ("estimate sheet") of the document. As in the document 20 in FIG. 9, even in a case where information of separating the value corresponding to the keyword from other character strings is not provided in the document, the number of description lines of the value may be predetermined.

In a case of a document 20 having a format in which the number of description lines of the value is fixed to M lines (M is a positive integer), the setting value N of the extraction end condition in the extraction rule 30 in FIG. 3 may be set to "2" representing "Condition 2". Then, the information processing illustrated in FIG. 5 may be performed by associating "Condition 2" with a condition of "ending in a case where the number of extracted lines of the value reaches M lines".

In a case of the format of the document 20 in FIG. 9, setting of "M=2" is performed. In a case where the number of description lines of the value is set to be the extraction end condition of the value, a counter Y that records the number of lines in which the value has been extracted is used. The counter Y is initialized to "0" in advance every time the information processing in FIG. 5 is performed. Every time the value is extracted in each of Step S10 and Step S40 in FIG. 5, "1" is added to the counter Y.

"Condition 2" is set as the extraction end condition of the extraction rule 30. Thus, in a case where it is determined that the counter Y reaches the value M, by the determination process of Step S30, it is determined that extraction of the value has ended.

That is, in a case of the document 20 having a format illustrated in FIG. 9, lines in which "First ABCD" and "Corporation Messrs" are described are recognized as a description range of a value corresponding to a keyword of "Messrs", and "First ABCD Corporation" is extracted as the value corresponding to the keyword of "Messrs".

Figure 10:
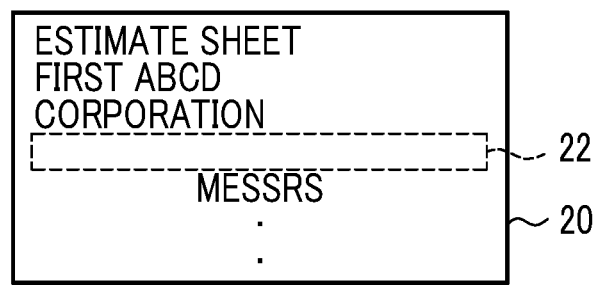
FIG. 10 is a diagram illustrating an example of a document in which the blank line is provided, and the number of description lines of the values is predetermined.

For example, as illustrated in FIG. 10, the number of description lines of the value is fixed to M lines (M=2) in the document 20. However, there is a document 20 having a format in which a blank line 22 is provided between the description line of the keyword and the value, and the value is not included in the description line of the keyword.

Even in a case of a document 20 as illustrated in FIG. 10, in a case where the value is not extracted in Step S10 and Step S40 of the information processing illustrated in FIG. 5, "1" is not added to the counter Y. Thus, in a case where the value is not included in the description line of the keyword and a case where the extraction target line of the value is the blank line 22, the value of the counter Y does not change.

That is, the information processing apparatus 10 extracts the value from each line of M lines in total, which includes a line in which the value has been extracted for the first time, by sequentially referring the lines from the description line of the keyword in a direction indicated by the second extraction direction until a line including the value appears, while skipping the blank line. Thus, even in a case of the document 20 as illustrated in FIG. 10, "First ABCD Corporation" is extracted as the value corresponding to the keyword of "Messrs".

Modification Example 3 of Exemplary Embodiment

Among documents 20, there is also a document 20 in which a blank line is not used as a break of a description range of a value, and the number of description lines of the value is not predetermined. In such a case, a description position of a character string may be used as a key of determining whether or not the character string in the document 20 is the value corresponding to the keyword.

Regarding the value corresponding to the keyword and other character strings, the position of the leading character in the line direction may be shifted. For example, in a case of a document 20 illustrated in FIG. 11, the title (character string of "estimate sheet") of the document 20 is disposed at the center of the document 20 in the line direction, and the name of a company is disposed to start from the left of the position of the leading character of a character string representing the title of the document 20. In the document 20 illustrated in FIG. 11, the name of the company is described across two lines. However, in a case where the value such as the name of the company is described across a plurality of lines, the value is a series of character strings. Thus, the leading character of the value is disposed at the same position in each line, in many cases.

Thus, in a case of a document 20 having a format in which the leading character of the value is disposed in each line at a position different from the position of the leading character of a character string included in a line (simply referred to as "an adjacent line" below) adjacent to the description range of the value, the setting value N of the extraction end condition in the extraction rule 30 in FIG. 3 may be set to "3" representing "Condition 3". Then, the information processing illustrated in FIG. 5 may be performed by associating "Condition 3" with a condition of "ending in a case where the positions of the leading characters in lines are different from each other".

In this case, the CPU 41 acquires the position of the leading character of the value extracted from the description line of the keyword in Step S10, in the line direction. In Step S30, the CPU 41 acquires the position of the leading character of a character string included in the extraction target line of the value updated in Step S20, in the line direction.

"Condition 3" is set as the extraction end condition of the extraction rule 30. Thus, in the determination process of Step S30, the CPU 41 compares the position of the leading character of the character string included in the updated extraction target line of the value to the position of the leading character of the value, which has been acquired in Step S10. In a case where it is determined that the positions of the leading characters are different from each other, it is considered that the value corresponding to the keyword is not included in the updated extraction target line of the value. Thus, it is determined that extraction of the value has ended.

In a case where it is determined that the positions of the leading characters are the same as each other, the character string included in the extraction target line of the value is extracted as the value in Step S40. The extraction target line of the value is repeatedly updated in Step S20 until an extraction target line of the value in which the position of the leading character differs, and thereby the value is extracted from lines until the extraction target line of the value, in which the position of the leading character differs, appears, in Step S40.

Figure 11:
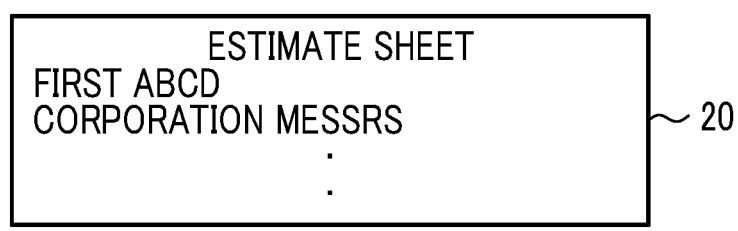
FIG. 11 is a diagram illustrating an example of a document in which a position of a leading character of a value is different from a position of a character string in an adjacent line.

That is, in a case of the document 20 having a format illustrated in FIG. 11, it is recognized that the value corresponding to the keyword is not included in a line in which a character string of "estimate sheet" is included, and "First ABCD Corporation" is extracted as the value corresponding to the keyword of "Messrs".

Figure 12:
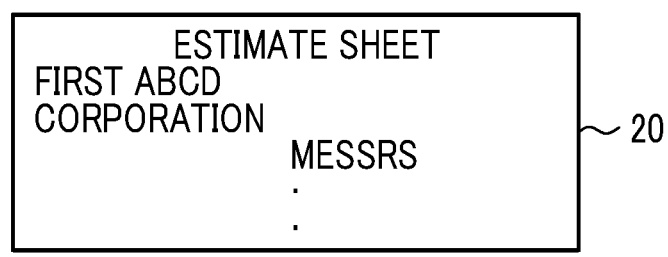
FIG. 12 is a diagram illustrating an example of a document in which the value is not provided in the description line of the keyword, and the position of the leading character of the value is different from the position of the character in the adjacent line.

For example, among the documents 20, as illustrated in FIG. 12, there is a document 20 having a format in which the position of the leading character of the value is different from the position of another character string, but the value is not included in the description line of the keyword.

In this case, the position of the leading character of the value extracted from the description line of the keyword in Step S10, in the line direction, is not acquired. Thus, it is difficult to apply the information processing illustrated in FIG. 5 itself.

Thus, in a case where the value is not extracted from the description line of the keyword in Step S10 in FIG. 5, for example, processing is preferably switched to perform information processing different from the information processing in FIG. 5.

Figure 13:
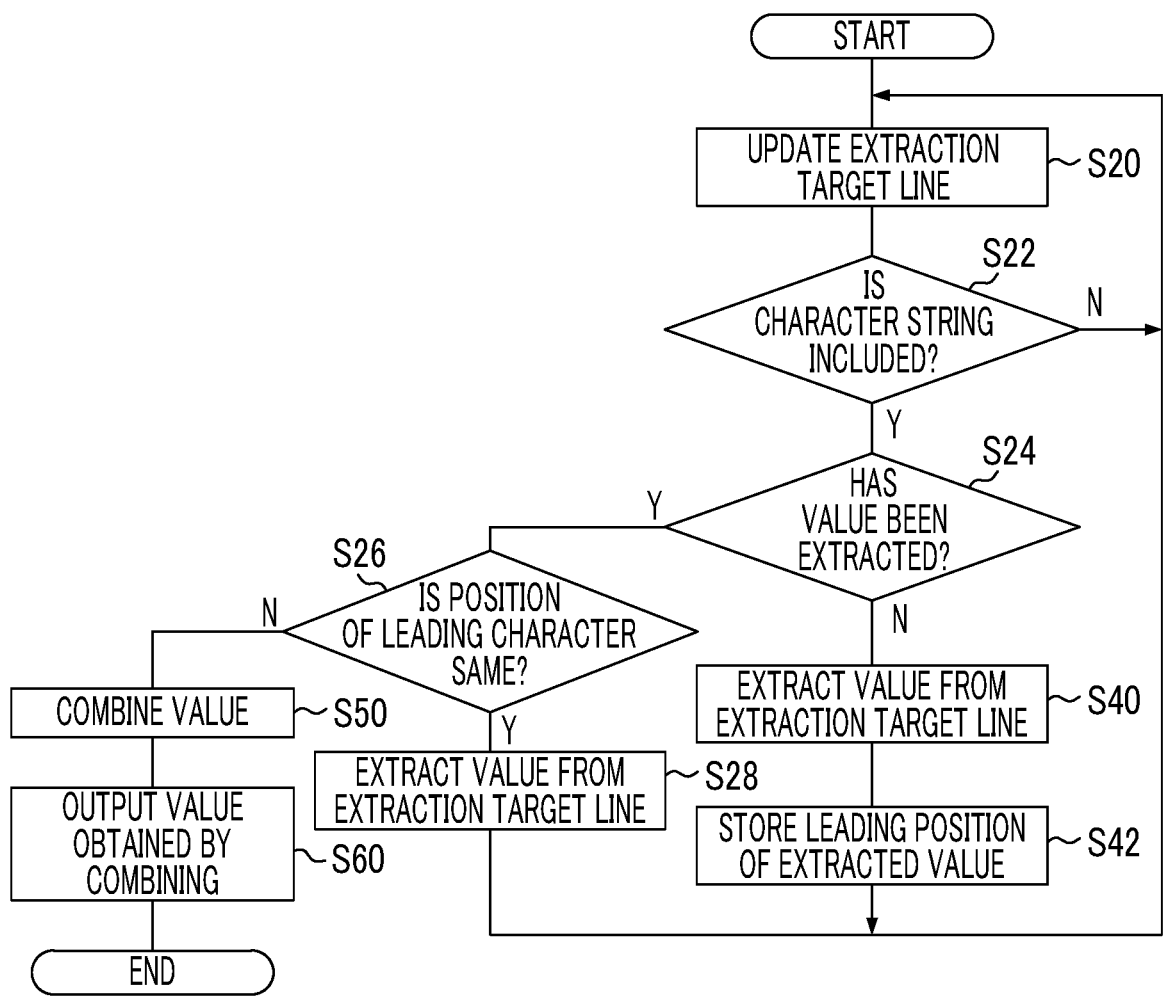
FIG. 13 is a flowchart illustrating an example of the flow of the information processing on a document in which the value is not provided in the description line of the keyword, and the position of the leading character of the value is different from the position of the character in the adjacent line.

FIG. 13 is a flowchart illustrating an example of a flow of information processing performed by the CPU 41 in a case where there is an attempt to extract the value from the description line of the keyword in Step S10 in FIG. 5, but the value is not extracted.

As already described with reference to FIG. 5, in Step S20, the CPU 41 updates an extraction target line for extracting the value the next time, by referring to the setting value of the second extraction direction included in the extraction rule 30.

In Step S22, the CPU 41 determines whether or not a character string is included in the updated extraction target line of the value. In a case where there is no character string, it is considered that the updated extraction target line of the value is a blank line. Thus, the process proceeds to Step S20, and the extraction target line of the value is updated. In a case where the character string is included, the process proceeds to Step S24.

In Step S24, the CPU 41 determines whether or not the value has been extracted from any of the description line of the keyword and the extraction target line of the value. In a case where the value is not extracted, the current extraction target line of the value means a first extraction target line including the value. Thus, the process proceeds to Step S40, and, as described in Step S40 in FIG. 5, the CPU 41 extracts the character string included in the updated extraction target line of the value, as the value, and stores the extracted character string in the RAM 43. In Step S42, the CPU 41 stores the position of the leading character of the value extracted in Step S40 in the line direction, in the RAM 43. Then, the process proceeds to Step S20. Thus, the position of the leading character of the value is stored. In a case of the document 20 illustrated in FIG. 12, the position of "C" in "Corporation" is stored.

In a case where it is determined that the value has been already extracted, by the determination process in Step S24, the process proceeds to Step S26.

In Step S26, the CPU 41 acquires the position of the leading character of a character string included in the extraction target line of the value updated in Step S20. The CPU 41 determines whether or not the acquired position of the leading character is the same as the position of the leading character of the value, which has been stored in Step S42. In a case where the positions of the leading characters are the same as each other, the character string included in the extraction target line of the value is considered as the value corresponding to the keyword. Thus, the process proceeds to Step S28.

In Step S28, the CPU 41 extracts a character string included in the extraction target line of the value, as the value, and stores the extracted character string in the RAM 43. Then, the process proceeds to Step S20. In this manner, a partial value is extracted from lines including the character string starting from a position which is the same as the position of the leading character of the value in the line in which the value has been extracted for the first time.

In a case where it is determined that the positions of the leading characters are different from each other, by the determination process of Step S26, the process proceeds to Step S50. The phrase that the position of the leading character of the character string included in the extraction target line of the value is different from the stored position means that the character string included in the current extraction target line of the value is not the character string representing the value corresponding to the keyword.

Thus, as described in Step S50 in FIG. 5, the CPU 41 generates a final value by combining the extracted values in accordance with a line sequence, without extracting the character string from the current extraction target line of the value. In Step S60, the CPU 41 outputs the value obtained by combining in Step S50 and ends the information processing illustrated in FIG. 13.

In the process of referring to lines from the description line of the keyword in the direction set by the second extraction direction, the position of a leading character in a line in which a character string other than the keyword is included for the first time is set as the position of the leading character of the value. Thus, the value corresponding to the keyword is extracted even from a document 20 having a format in which the position of the leading character of the value is different from the position of the leading character of a character string included in the adjacent line, and the value is not included in the description line of the keyword, as in the document 20 illustrated in FIG. 12.

Modification Example 4 of Exemplary Embodiment

Among the documents 20, there is also a document 20 in which a blank line is not necessarily used as the break of the description range of the value, the number of description lines of the value is not predetermined, and no particular difference is provided between the positions of the leading characters of a character string representing the value and other character strings. In such a case, a visual difference in a format, which represents a character string may be used as a key of determining whether or not the character string in the document 20 is the value corresponding to the keyword.

Figure 14:
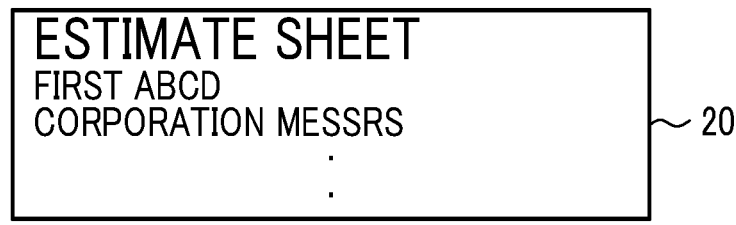
FIG. 14 is a diagram illustrating an example of a document in which a character attribute of the value is different from a character attribute of a character string included in the adjacent line.

For example, in a case of a document 20 illustrated in FIG. 14, in order to cause a user to recognize that "estimate sheet" is the title of the document 20, and "First ABCD Corporation" is the name of a company as a submission destination of the estimate sheet, the size of the character is changed between a character string representing the title of the document 20 and a character string representing the submission destination of the document 20.

The visual difference in a form, which represents the character string occurs by a difference in a character attribute of the character string, for example. That is, "the character attribute" is a collection of elements that define the appearance of a character in the document 20. For example, elements of defining the character attributes include at least one element of the size of a character, the font of the character, the thickness of the character, the decoration of the character, and the color of the character. Since the character code is an element indicating the meaning of a character, the character attribute does not include the character code.

"The decoration of a character" means that the outline of the character is modified in a range in which the original meaning of the text can be read or that another element is added to the character. For example, a character in italics and a character to which an underline, a strikethrough, a side point, or shading is applied are examples of a decorated character.

The visual difference in a format, which represents a character string also includes a space between character strings. For example, a relationship between two character strings is represented by adjusting a space between the character strings. Specifically, it is recognized that, as the space between character strings becomes longer, a degree of the character strings being associated with each other is reduced. Thus, the space between character strings indicates a key in that two character strings may be handled as character strings representing a series of meanings, or may be handled as character strings having completely no relationship with each other. That is, the space between character strings is also an example of the character attribute of the character string.

Thus, in a case of a document 20 having a form set to cause the character attribute of the value corresponding to the keyword to be different from the character attribute of a character string included in an adjacent line, the setting value N of the extraction end condition in the extraction rule 30 in FIG. 3 may be set to "4" representing "Condition 4". Then, the information processing illustrated in FIG. 5 may be performed by associating "Condition 4" with a condition of "ending in a case where the character attributes of the character strings are different from each other".

In this case, the CPU 41 acquires the character attribute common to the value extracted from the extracted from the description line of the keyword in Step S10. In Step S30, the CPU 41 acquires the character attribute common to a character string included in the extraction target line of the value updated in Step S20.

"Condition 4" is set as the extraction end condition of the extraction rule 30. Thus, in the determination process of Step S30, the CPU 41 compares the common character attribute of a character string included in the updated extraction target line of the value to the character attribute acquired in Step S10. In a case where it is determined that the character attributes are different from each other, it is considered that the value corresponding to the keyword is not included in the updated extraction target line of the value. Thus, it is determined that extraction of the value has ended.

In a case where it is determined that the character attributes are the same as each other, the character string included in the extraction target line of the value is extracted as the value in Step S40. The extraction target line of the value is repeatedly updated in Step S20 until an extraction target line of the value in which the character attribute differs from the character attribute of the value extracted from the description line of the keyword appears, and thereby the value is extracted from lines from the description line of the keyword until the extraction target line of the value, in which the character attribute differs, appears, in Step S40.

That is, in a case of the document 20 having a format illustrated in FIG. 14, it is recognized that the value corresponding to the keyword is not included in a line in which a character string of "estimate sheet" is included, and "First ABCD Corporation" is extracted as the value corresponding to the keyword of "Messrs".

Figure 15:
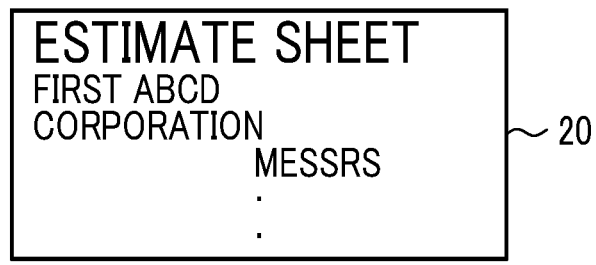
FIG. 15 is a diagram illustrating an example of a document in which the value is not provided in the description line of the keyword, and the character attribute of the value is different from the character attribute of the character string included in the adjacent line.

For example, among the documents 20, as illustrated in FIG. 15, there is a document 20 having a format in which a desired character attribute of the value is different from the character attribute of a character string included in an adjacent line, but the value is not included in the description line of the keyword.

In this case, the character attribute of the value extracted from the description line of the keyword in Step S10 is not acquired. Thus, it is difficult to apply the information processing illustrated in FIG. 5 itself.

Thus, in a case where the value is not extracted from the description line of the keyword in Step S10 in FIG. 5, for example, processing is preferably switched to perform information processing described with reference to FIG. 13.

In this case, in Step S42 of information processing illustrated in FIG. 13, the CPU 41 stores the character attribute common to the value, in the RAM 43 instead of the position of the leading character of the value extracted in Step S40, in the line direction. In this state, in Step S26 of the information processing illustrated in FIG. 13, the CPU 41 does not acquire the position of the leading character of a character string included in the extraction target line of the value updated in Step S20, but acquires the character attribute common to the character string. In a case where it is determined whether or not the acquired character attribute is the same as the character attribute stored in Step S42, the value corresponding to the keyword is extracted even from a document 20 having a format in which the desired character attribute of the value is different from the character attribute of a character string included in an adjacent line, but the value is not included in the description line of the keyword, as in the document 20 illustrated in FIG. 15. Even though a blank line is provided in the document 20, the value corresponding to the keyword is extracted.

Since there is a tendency of using the same character attribute in the keyword and the value, in a case where the value is not included in the description line of the keyword, the character attribute of the keyword may be set as the character attribute of the value.

In the exemplary embodiment and the modification examples described above, the descriptions are made on the assumption that a character string other than the value is not included in the description line of the value. However, among the documents 20, there is also a document 20 having a format in which a character string other than the value is included in the description line of the value.

Figure 16:
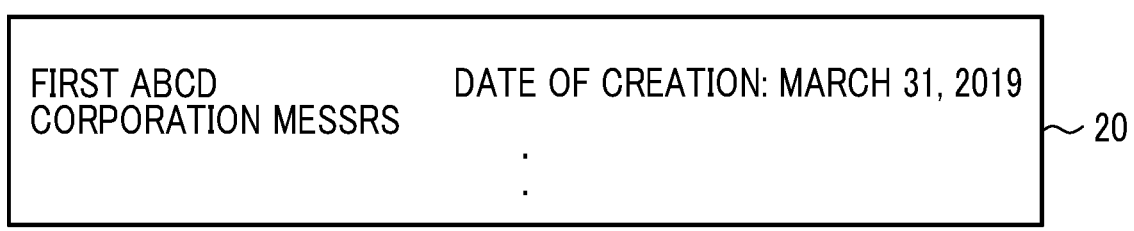
FIG. 16 is a diagram illustrating an example of a document in which a character string other than the value is provided in the description line of the value.

In a case of an example of a document 20 illustrated in FIG. 16, "First ABCD" is a partial value corresponding to the keyword of "Messrs". However, a character string having no relationship with the keyword, such as "Date of creation: March 31, 2019", is included in the description line of the partial value of "First ABCD".

In such a case, the CPU 41 extracts the value corresponding to the keyword from lines in which a plurality of character strings are described, by using the first extraction direction set in the extraction rule 30 and the visual difference in the format, which represents the character string.

As described above, it is considered that, as the difference in a character attribute becomes smaller, the character strings are character strings representing a series of meanings. Thus, the CPU 41 separates character strings included in lines from each other by a difference in character attribute, with reference to character attributes of a character string in each line. In a case where the CPU 41 acquires a plurality of character strings from the same line, the CPU 41 may extract a character string in which the position of the leading character is the same as the position of the leading character of the keyword in the line direction or is in a direction indicated by the first extraction direction from the position of the leading character of the keyword, for example, among the plurality of character strings, as the value. In a case where a plurality of such character strings are provided, the CPU 41 extracts a character string which, for example, is the closest to the position of the leading character of the keyword among the plurality of character strings, as the value.

As described above, the information processing apparatus 10 extracts the value corresponding to the keyword based on the extraction rule 30 in which the condition which is most appropriate for extracting the value is set among the plurality of conditions, in consideration of the feature of the format of the document 20 as the extraction target of the value corresponding to the keyword.

In a case where an extraction end condition other than the extraction end condition (Condition 2) corresponding to the format in which the number of description lines of the value is used as the extraction rule 30, the value corresponding to the keyword is extracted even from a document 20 which is unclear from a point of lines across which the value is described.

Hitherto, although the present invention has been described above using the exemplary embodiment, the present invention is not limited to the scope described in the exemplary embodiment. Various changes or modifications can be added to the exemplary embodiment without departing from the scope of the present invention, and a form to which the changes or improvements are added is also included in the technical scope of the present invention. For example, the order of processing may be changed without departing from the scope of the present invention.

In the exemplary embodiment, a form in which the information processing is realized by software has been described as an example. However, processing equivalent to the flowcharts illustrated in FIGS. 5, 8, and 13 is implemented in, for example, an application specific integrated circuit (ASIC) and may be performed by hardware. In this case, a processing speed can be increased in comparison to a processing speed in a case where the information processing is realized by software.

Further, instead of realizing each functional unit and the extraction rule DB 16 illustrated in FIG. 1 by the single information processing apparatus 10, processing equivalent to the processing of the information processing apparatus 10 may be executed by being distributed and arranged in a plurality of information devices using cloud computing, and linking the plurality of information devices to each other.

In the above-described exemplary embodiment, a form in which the information processing program is installed in the ROM 42 is described. However, it is not limited thereto. The information processing program according to the exemplary embodiment of the present invention can also be provided in a form of being recorded in a computer-readable storage medium. For example, the information processing program according to the exemplary embodiment of the present invention may be provided in a form of being recorded on an optical disc such as a compact disc (CD)-ROM or a digital versatile disc (DVD)-ROM. The information processing program according to the exemplary embodiment of the present invention may be provided in a form of being recorded in a semiconductor memory such as a universal serial bus (USB) memory and a flash memory. Further, the information processing apparatus 10 may acquire the information processing program according to the exemplary embodiment of the present invention from an external device connected to a communication line (not illustrated) via the communication unit 47.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor, configured to:
extract a character string corresponding to a keyword from character strings including the keyword described across a plurality of lines, in accordance with an extraction condition of the character string corresponding to the keyword,
wherein an extraction direction of the character string corresponding to the keyword, which is viewed from a description position of the keyword, is determined as the extraction condition, and
wherein in a case where the character string corresponding to the keyword is extracted from the plurality of lines, the extraction direction represents a direction of transition from a description line of the keyword toward a previous line or a direction of transition from the description line of the keyword toward a subsequent line;
combine extracted character strings in accordance with a line sequence; and
output the combined character strings as the character string corresponding to the keyword.

2. The information processing apparatus according to claim 1,
wherein the processor sequentially refers to lines in the extraction direction and extracts the character string corresponding to the keyword from each of lines from the description line of the keyword to a line before a blank line in which any character is not described appears.

3. The information processing apparatus according to claim 2,
wherein, in a case where the character string corresponding to the keyword is not extracted from the description line of the keyword, and a line adjacent to the description line of the keyword in the extraction direction is a blank line, the processor
sequentially refers to the lines in the extraction direction from the description line of the keyword until a line including the character string corresponding to the keyword appears, and
extracts the character string corresponding to the keyword from each of lines from a line in which the character string corresponding to the keyword appears for a first time to a line before the blank line appears again.

4. The information processing apparatus according to claim 1,
wherein the processor extracts the character string corresponding to the keyword, from each of lines from the description line of the keyword to a predetermined number of lines in the extraction direction.

5. The information processing apparatus according to claim 4,
 wherein, in a case where the character string corresponding to the keyword is not extracted from the description line of the keyword, the processor
  sequentially refers to lines in the extraction direction from the description line of the keyword until a line including the character string corresponding to the keyword appears, and
  extracts the character string corresponding to the keyword, from each of lines from the line in which the character string corresponding to the keyword appears for a first time to the predetermined number of lines, in the extraction direction.

6. The information processing apparatus according to claim 1,
 wherein the processor
  sequentially refers to lines in the extraction direction, and
  extracts the character string corresponding to the keyword, from each of lines before a line having a position of a leading character in a line direction different from a position of a leading character in the description line of the keyword appears.

7. The information processing apparatus according to claim 6,
 wherein, in a case where the character string corresponding to the keyword is not extracted from the description line of the keyword, the processor
  sequentially refers to lines in the extraction direction from the description line of the keyword until a line including the character string corresponding to the keyword appears, and
  extracts the character string corresponding to the keyword, from each of lines from a line in which the character string corresponding to the keyword appears for a first time before a line having a position of a leading character different from a position of a leading character in the line in which the character string corresponding to the keyword appears for the first time appears.

8. The information processing apparatus according to claim 1,
 wherein the processor
  sequentially refers to lines in the extraction direction, and
  extracts the character string corresponds to the keyword from each of lines before a line in which a character attribute different from a character attribute of the character string corresponding to the keyword, which is extracted for a first time is used.

9. The information processing apparatus according to claim 8,
 wherein at least one of a size, a font, a thickness, a decoration, or a color of a character is set as the character attribute of the character string corresponding to the keyword.

10. The information processing apparatus according to claim 8,
 wherein, in a case where a plurality of character strings is provided for any line as an extraction target of the character string corresponding to the keyword, the processor extracts the character string corresponding to the keyword from the plurality of character strings, in accordance with the character attribute of the character string.

11. The information processing apparatus according to claim 9,
 wherein, in a case where a plurality of character strings is provided for any line as an extraction target of the character string corresponding to the keyword, the processor extracts the character string corresponding to the keyword from the plurality of character strings, in accordance with the character attribute of the character string.

12. A non-transitory computer readable medium storing an information processing program causing a computer to:
 extract a character string corresponding to a keyword from character strings including the keyword described across a plurality of lines, in accordance with an extraction condition of the character string corresponding to the keyword,
  wherein an extraction direction of the character string corresponding to the keyword, which is viewed from a description position of the keyword, is determined as the extraction condition, and
  wherein in a case where the character string corresponding to the keyword is extracted from the plurality of lines, the extraction direction represents a direction of transition from a description line of the keyword toward a previous line or a direction of transition from the description line of the keyword toward a subsequent line;
 combine extracted character strings extracted by the extraction unit in accordance with a line sequence; and
 output the combined character strings as the character string corresponding to the keyword.

* * * * *